(12) United States Patent
Joensen et al.

(10) Patent No.: US 9,689,211 B2
(45) Date of Patent: Jun. 27, 2017

(54) CONNECTOR DEVICE FOR USE IN WIRELINE INTERVENTION OPERATIONS

(71) Applicant: National Oilwell Varco UK Limited, Manchester (GB)

(72) Inventors: Runi Joensen, Westhill (GB); Christopher McLaren, Aberdeen (GB)

(73) Assignee: National Oilwell Varco UK Limited, Manchester (GB)

( * ) Notice: Subject to any disclaimer, the term of this patent is extended or adjusted under 35 U.S.C. 154(b) by 506 days.

(21) Appl. No.: 14/359,895

(22) PCT Filed: Dec. 28, 2012

(86) PCT No.: PCT/GB2012/053272
§ 371 (c)(1),
(2) Date: May 21, 2014

(87) PCT Pub. No.: WO2013/098560
PCT Pub. Date: Jul. 4, 2013

(65) Prior Publication Data
US 2014/0318809 A1 Oct. 30, 2014

(30) Foreign Application Priority Data
Dec. 30, 2011 (GB) .................................. 1122466.4

(51) Int. Cl.
*E21B 17/02* (2006.01)
*E21B 33/038* (2006.01)
(Continued)

(52) U.S. Cl.
CPC ............ *E21B 17/02* (2013.01); *E21B 33/038* (2013.01); *E21B 33/072* (2013.01); *F16L 37/121* (2013.01); *F16L 37/62* (2013.01)

(58) Field of Classification Search
CPC ........ E21B 17/02; E21B 17/023; E21B 17/03; E21B 17/04; E21B 17/046; E21B 17/08; E21B 17/085
See application file for complete search history.

(56) References Cited

U.S. PATENT DOCUMENTS 2,951,274 A * 9/1960 Elsner .................. B60P 7/0807
24/635
3,589,441 A 6/1971 Brown et al.
(Continued)

FOREIGN PATENT DOCUMENTS

GB 2081831 A 2/1982
WO WO-2007028982 A1 3/2007
(Continued)

OTHER PUBLICATIONS

Schlumberger Oilfield Glossary entry for "wireline", accessed Oct. 27, 2016 via www.glossary.oilfield.slb.com.*
(Continued)

*Primary Examiner* — Blake Michener
(74) *Attorney, Agent, or Firm* — Winstead PC

(57) ABSTRACT

A wireline connector device (10) for use in wireline intervention operations comprises a housing (18) connected to a first wireline conduit (L), a piston sleeve (46) located within the housing, and a collet device (60) configured to receive and retain a second wireline conduit, the collet device having a plurality of collet fingers (58) arranged within the piston sleeve, which is movable within the housing to open and close the collet fingers. Optionally a restrictor (57) can be configured to control the movement of the piston sleeve, and can be adjustable to lock the piston sleeve in the second position when the collet fingers are closed around the second wireline conduit. Typically at least one indicator rod (55)

(Continued)

projects from the housing, and the piston sleeve engages indictor rod in the second position.

22 Claims, 6 Drawing Sheets

(51) Int. Cl.
*E21B 33/072* (2006.01)
*F16L 37/12* (2006.01)
*F16L 37/62* (2006.01)

(56) References Cited

U.S. PATENT DOCUMENTS

| | | | |
|---|---|---|---|
| 3,999,260 A * | 12/1976 | Stuckey | E21B 19/10 188/67 |
| 4,153,278 A * | 5/1979 | Ahlstone | F16L 27/06 285/146.3 |
| 4,337,971 A * | 7/1982 | Kendrick | F16L 37/121 285/315 |
| 4,566,168 A * | 1/1986 | Stromberg | E21B 17/02 285/319 |
| 4,647,254 A | 3/1987 | Baugh et al. | |
| 4,693,497 A * | 9/1987 | Pettus | E21B 33/038 285/12 |
| 4,708,376 A | 11/1987 | Jennings et al. | |
| 4,902,044 A | 2/1990 | Williams et al. | |
| 4,902,045 A | 2/1990 | McGugan et al. | |
| 4,984,830 A | 1/1991 | Saunders | |
| 5,441,311 A | 8/1995 | Watkins | |
| 5,971,076 A | 10/1999 | Taylor et al. | |
| 6,035,938 A | 3/2000 | Watkins | |
| 6,070,669 A | 6/2000 | Radi et al. | |
| 6,089,321 A | 7/2000 | Morrill | |
| 6,129,149 A | 10/2000 | Beall | |
| 6,138,762 A * | 10/2000 | Sweeney | E21B 33/038 166/338 |
| 6,234,252 B1 | 5/2001 | Pallini, Jr. et al. | |
| 6,260,624 B1 | 7/2001 | Pallini, Jr. et al. | |
| 6,293,343 B1 | 9/2001 | Pallini, Jr. et al. | |
| 6,540,024 B2 | 4/2003 | Pallini et al. | |
| 6,595,293 B2 * | 7/2003 | Carter | E21B 33/038 166/345 |
| 6,609,731 B2 | 8/2003 | DeBerry et al. | |
| 6,609,734 B1 | 8/2003 | Baugh | |
| 6,824,171 B2 * | 11/2004 | Milberger | E21B 33/038 285/123.13 |
| 6,902,199 B2 | 6/2005 | Colyer et al. | |
| 7,469,931 B2 | 12/2008 | Biester | |
| 7,537,057 B2 | 5/2009 | Singeetham et al. | |
| 7,614,453 B2 | 11/2009 | Spiering et al. | |
| 7,686,087 B2 | 3/2010 | Pallini et al. | |
| 8,562,028 B2 | 10/2013 | Smith et al. | |
| 9,334,705 B1 * | 5/2016 | Ward | E21B 33/038 |
| 2001/0045286 A1 | 11/2001 | Pallini et al. | |
| 2002/0096878 A1 | 7/2002 | DeBerry et al. | |
| 2003/0151254 A1 | 8/2003 | Baugh | |
| 2004/0102069 A1 | 5/2004 | Singeetham et al. | |
| 2004/0144571 A1 * | 7/2004 | Boyd | E21B 17/05 175/321 |
| 2004/0226722 A1 | 11/2004 | Colyer et al. | |
| 2005/0001427 A1 | 1/2005 | Liew | |
| 2005/0146137 A1 | 7/2005 | Davidson et al. | |
| 2005/0206162 A1 | 9/2005 | Biester | |
| 2007/0181309 A1 | 8/2007 | Singeetham et al. | |
| 2007/0267197 A1 | 11/2007 | Pallini et al. | |
| 2007/0277983 A1 | 12/2007 | Spiering et al. | |
| 2009/0322074 A1 | 12/2009 | Pallini, Jr. et al. | |
| 2010/0078174 A1 | 4/2010 | Spiering et al. | |
| 2010/0288503 A1 | 11/2010 | Cuiper et al. | |
| 2011/0079399 A1 | 4/2011 | Nguyen et al. | |
| 2011/0241335 A1 | 10/2011 | Smith et al. | |

FOREIGN PATENT DOCUMENTS

| | | | |
|---|---|---|---|
| WO | WO-2008033738 A2 | 3/2008 | |
| WO | WO-2010099269 A1 | 9/2010 | |

OTHER PUBLICATIONS

Dictionary definition of "permits", accessed Apr. 7, 2017 via www.thefreedictionary.com.*

Ott, Stéphane, "International Search Report", prepared for PCT/GB2012/053272, mailed on Jan. 3, 2014, 5 pages.

* cited by examiner

CONNECTOR DEVICE FOR USE IN WIRELINE INTERVENTION OPERATIONS

FIELD OF THE INVENTION

The present invention relates to a connector device for use in wireline intervention operations, used in the field of oil and gas production.

BACKGROUND TO THE INVENTION

Collet connectors are used in the oil and gas production industry to connect two pipes or pipelines together. They comprise a generally cylindrical body with a frustum shaped gripping section. The gripping section will usually comprise a number of "fingers", which are splayed outward to form the generally frustum shaped section. This defines a bore or socket at its centre to receive an item to be connected.

A locking ring or similar device may be selectively moved over these fingers to force them inwardly and thereby clamp over an item to be connected, such as a pipeline.

Collet connectors may be used in a variety of locations and applications within the oil and gas production industry. For example, they may be used to connect pipelines together and onto wellheads.

SUMMARY OF THE INVENTION

According to a first aspect of the present invention there is provided a connector device for use in wireline intervention operations, for coupling a first wireline conduit to a second wireline conduit, the connector comprising a housing on the first wireline conduit, a piston sleeve located within the housing, a collet device configured to receive and retain the second wireline conduit, the collet device having a plurality of collet fingers arranged within said piston sleeve, the piston sleeve being movable within the housing from a first position, where the collet fingers are in a receiving position, to a second position, where the collet fingers are in a clamping position.

Optionally the device can incorporate a restrictor configured to control the movement of the piston sleeve. The restrictor can optionally be adjustable between a first configuration in which it permits free movement of the piston sleeve, and a second configuration, in which it restricts movement of the piston sleeve. Optionally the second configuration of the restrictor locks the piston sleeve in the second position when the collet fingers are in the clamping position. Typically the restrictor includes at least one indicator rod which typically projects from the housing. Typically the piston sleeve engages the indictor rod in the second position. Optionally the restrictor comprises a threaded flange axially movable on a thread relative to the piston sleeve. The indicator rod is typically disposed between the flange and the piston sleeve, and the flange can be screwed down the thread to urge the indicator rod against the piston sleeve and lock it in position.

Optionally the housing can be connected to one of the conduits, typically being formed separately and then attached, or optionally can be formed integrally with one of the conduits. In certain examples, the housing can be provided on an adapter that is connected to one of the conduits, although it is also envisaged within the scope of the invention that the housing can be formed directly on the conduit.

The connector may be compatible with an adapter attachable to a suitable item to be connected, e.g. the wireline conduits.

The collet fingers and adapter may have cooperating profiles to enable an interference fit to be formed.

The restrictor may be in the form of a movable flange on the adapter. It may be provided by a threaded portion of adapter and a lock ring moveable on said threaded portion.

The piston sleeve may have a non-linear inner surface. It may be formed from four discontinuous sections. The four sections may be arranged with a narrowest mean diameter section at a first end of said piston, followed by a larger diameter section, followed by a narrower section followed lastly by a greatest mean diameter section.

The piston sleeve may have a piston flange projecting outwardly from its outer surface. The piston flange may be located within a piston recess located on the inner surface of the housing.

The outer surface of the collet fingers may form a generally frustum shape in the receiving position. The outer surface of the collet fingers may form a more cylindrical shape in the clamping position. The outer surface may include a recess or lesser diameter around the outer surface.

The housing may comprise an upper housing section and a lower housing section. Hydraulic bore(s) may be provided in the housing. The hydraulic bores may be used to provide a conduit for pressurised fluid to urge the piston sleeve from its first position to its second position.

The connector can optionally incorporate a test port, typically accessible from an external wall of the device, and ported to the external wall. Typically the test port is in communication with the seal between the first and second conduits, whereby pressure in the test port can be representative of the pressure at the seal, thereby allowing a user to monitor pressure at the port as a measure of the loading, integrity and functionality of the seal. Typically the test port allows injection of pressure behind the seal.

The connector may be adapted to be used in a surface environment, as opposed to a subsea environment.

According to a second aspect of the present invention there is provided a method of coupling a first wireline conduit to a second wireline conduit, the method comprising providing a housing on the first wireline conduit, a piston sleeve located within the housing, and a collet device configured to receive and retain the second wireline conduit, the collet device having a plurality of collet fingers arranged within said piston sleeve, and wherein the method includes moving the piston sleeve within the housing from a first position, where the collet fingers are in a receiving position, to a second position, where the collet fingers are in a clamping position.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising" "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or is preceding the recitation of the composition, element or group of elements and vice versa.

All numerical values in this disclosure are understood as being modified by "about". All singular forms of elements, or any other components described herein are understood to include plural forms thereof and vice versa.

DETAILED DESCRIPTION OF ONE OR MORE EMBODIMENTS OF THE INVENTION

An embodiment of the invention will now be described, by way of example only, with reference to the drawings.

Figure 1:
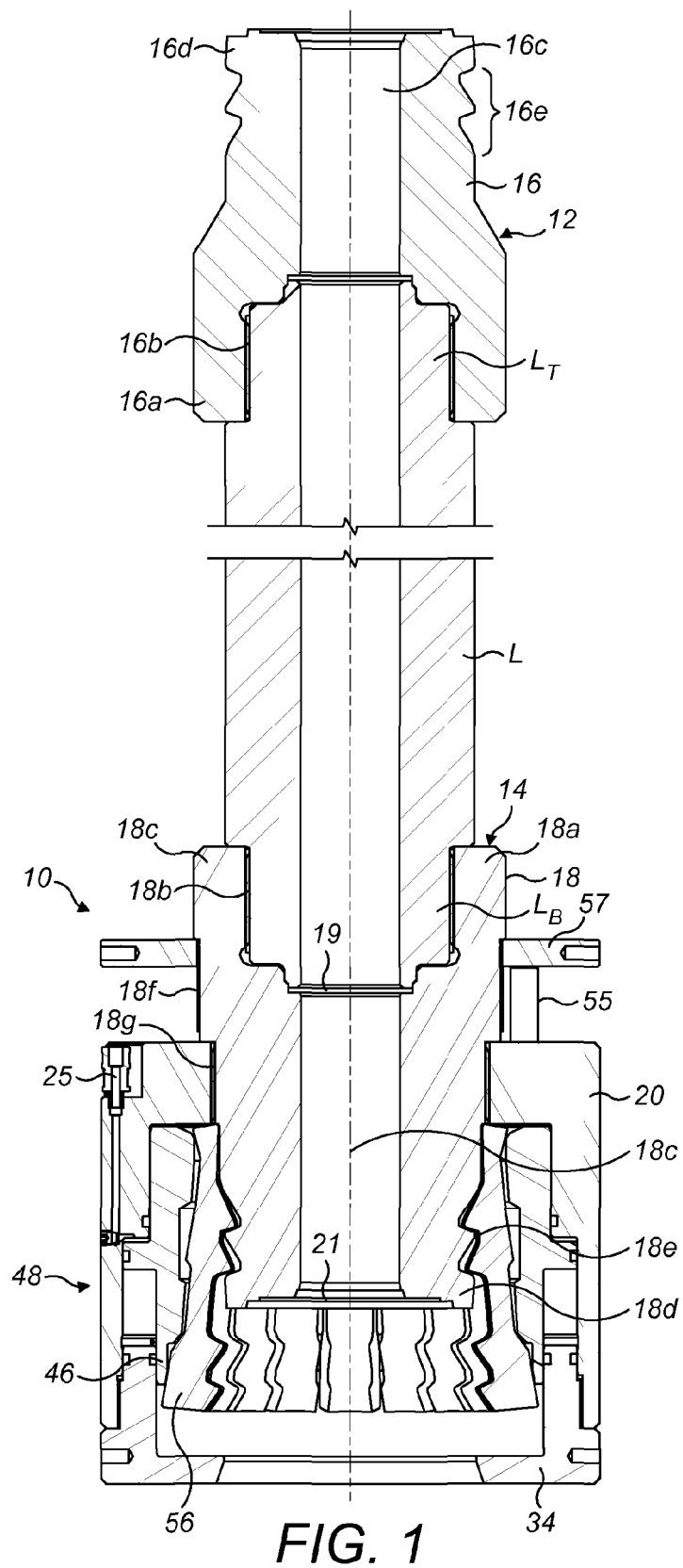
FIG. 1 is a sectional elevation of a connector in an open configuration on a first wireline conduit.

A collect connector 10 is depicted in section in FIG. 1. The connector 10 is shown attached to a wireline conduit in the form of a lubricator tube L. The lubricator tube L is a cylindrical low alloy steel tube which in this case has an internal diameter of 3.563" (90.5 mm) and an external diameter of 10" (254.0 mm).

The lubricator tube L has threaded ends $L_T$ and $L_B$. Two adapters 12,14 are attached to threaded ends $L_T$ and $L_B$ respectively, although in other examples of the invention, the features of the adapters 12,14 could be integral to the lubricator tube L and the adapters could be omitted. The adapters 12,14 comprise substantially cylindrical bodies 16,18 formed from an INCONEL® alloy. At first ends 16a,18a of the cylindrical bodies 16,18 are provided threaded sockets 16b,18b. As can be seen from FIG. 1, these threaded sockets 16b,18b receive and allow the connection of the adapters 12,14 to the lubricator tube L. It will be understood that connection is not limited to a lubricator tube L, but that any suitable device may be attached.

The adapters 12,14 have inner adapter bores 16c,18c provided within them, the inner adapter bores 16c,18c communicating with the threaded sockets 16b,18b. A fluid path right through the adapters 12,14 is therefore provided.

A metal seal 19 is located adjacent the junction between threaded socket 18b and the inner adapter bore 18c.

At second ends 16d,18d on the outer surface of the adapters 16,18 are annular toothed profiles 16e,18e. The annular toothed profiles 16e,18e are substantially sawtooth-shaped i.e. they are angled recesses within the outer surface of the adapters 16d,18d that have two surfaces at differing angles, one surface being more acute than the other. Two annular recesses are provided per profile 16e,18e in the present embodiment, but the number of recesses could be varied in different embodiments without departing from the scope of the invention.

A further metal seal 21 is located around the inner adapter bore 18c adjacent the second 18d.

Lower adapter 14 has two external threads located between its first end 18a and second end 18d. Towards the first end 18a (uppermost from the perspective of both Figs) is a lock ring thread 18f. Toward the second end 18d is a main housing thread 18g. Both threads 18f,18g are provided around the outer surface of the lower adapter 14, such that they allow the lower adapter 14 to be a "male" to subsequently described "female" pieces. Both threads 18f,18g are adjacent one another, with the lock ring thread 18f being of greater diameter than the main housing thread 18g, creating a step-wise change in the external diameter of the cylindrical body 18 of the lower adapter 14.

An upper housing 20 attaches to the lower adapter 14 via the main housing thread 18g of the lower adapter and a threaded orifice 22 of the upper main housing 20. The upper housing 20 comprises a flange 24 at the centre of which is defined the threaded orifice 22. A cylindrical sidewall 26 extends from the flange 24, the flange 24 and cylindrical sidewall 26 having substantially equivalent outermost diameters. An outer chamfer 28 is provided on the outer surface of the upper housing 20 at the junction of flange 24 and sidewall 26. A corresponding fillet 30 is provided on the inner surface of the upper housing 20 at the junction of flange 24 and sidewall 26.

A lower housing thread 32 is provided on the inner surface of the sidewall 26 at the distal end of the upper housing 20 from flange 24.

A lower housing 34 attaches to the upper housing 20 via the lower housing thread 32 of the upper housing 20 and an exterior housing thread 36 provided on the lower housing 34.

The lower housing 34 comprises a cylindrical sidewall 38, a lower inner housing flange 39 and a lower outer housing flange 40. The lower inner housing flange 39 defines a lower housing orifice 42 at its centre. The cylindrical sidewall 38 of the lower housing 34 is of a lesser diameter than the diameter of the cylindrical sidewall 26 of the upper housing 20. This allows the lower housing 34 to fit within and form a mating connection with the upper housing 20.

The cylindrical sidewall 26 of the upper housing 20 is of a uniform diameter on the outermost surface, but comprises two discrete regions of different wall thickness. These two regions create a stepwise change in diameter on the innermost surface. A greater thickness first section 26a extends from the flange 24 transitioning to a lesser thickness second section 26b. The lower housing thread 32 is located on the distal portion of the lesser thickness second section 26b.

A hydraulic bore 25 runs through the greater thickness first section 26a of the sidewall 26 and flange 24 of the upper housing 20, and terminates at the junction of the greater thickness first section 26a and the lesser thickness second section 26b. The hydraulic bore 25 branches at that point perpendicularly both to communicate with the interior and exterior of the upper housing 20.

The hydraulic bore 25 commences on the upper surface of the flange 24 with a mechanical connection point, in this embodiment a female quick connect fitting 25a, to allow hydraulic supplies to be fitted to it. A further mechanical connection point, in this example a male quick connect fitting 25b, is provided on the outer surface of the sidewall 26, also to allow hydraulic supplies to be fitted to it. The male quick connect fitting 25b is fitted with a blanking plug 25c, to provide a removable seal to the hydraulic bore 25.

As can be seen from the Figs, the lesser thickness second section 26b has a greater axial length than the cylindrical sidewall 38 of the lower housing 34, and thus an inner piston recess 44 is formed between the cylindrical sidewall 38 of the lower housing 34, the lesser thickness second section 26b and the greater thickness first section 26a. The hydraulic bore 25 is in fluid communication with the piston recess 44.

A piston sleeve 46 is located within the conjoined housing 49 (the conjoined housing 49 being the combined arrangement of upper housing 20 and lower housing 34).

Piston sleeve 46 is substantially cylindrical. It comprises a substantially cylindrical piston body 48 with a piston flange 50 extending outwardly from the cylindrical piston body 48 at the approximate mid-point of the cylindrical piston body 48. The piston flange 50 is housed within the inner piston recess 44, the cylindrical sidewall 38 of the lower housing 34, the lesser thickness second section 26b and the greater thickness first section 26a restricting its movement, as will subsequently be described.

Housing O-rings 27 are provided on the upper and lower housing to enable sealing. First housing O-ring 27a is mounted around the lower edge of the greater thickness first section 26a on the inner surface of the upper housing 20, to enable a seal to be formed between the upper housing 20 and the piston sleeve 46. The second housing O-ring 27b is mounted around the outer surface of an upper portion of the cylindrical sidewall 38 of the lower housing 34, enabling a seal to be formed between the lower housing 34 and the upper housing 20. The third housing O-ring 27c is mounted adjacent the second housing O-ring 27b on the inner surface of the upper portion of the cylindrical sidewall 38 of the lower housing 34, allowing a seal to be formed between the lower housing 24 and the piston sleeve 46.

The piston sleeve 46, although substantially cylindrical, has a non-linear inner surface 52 and non-linear outer surface 54.

Figure 2:
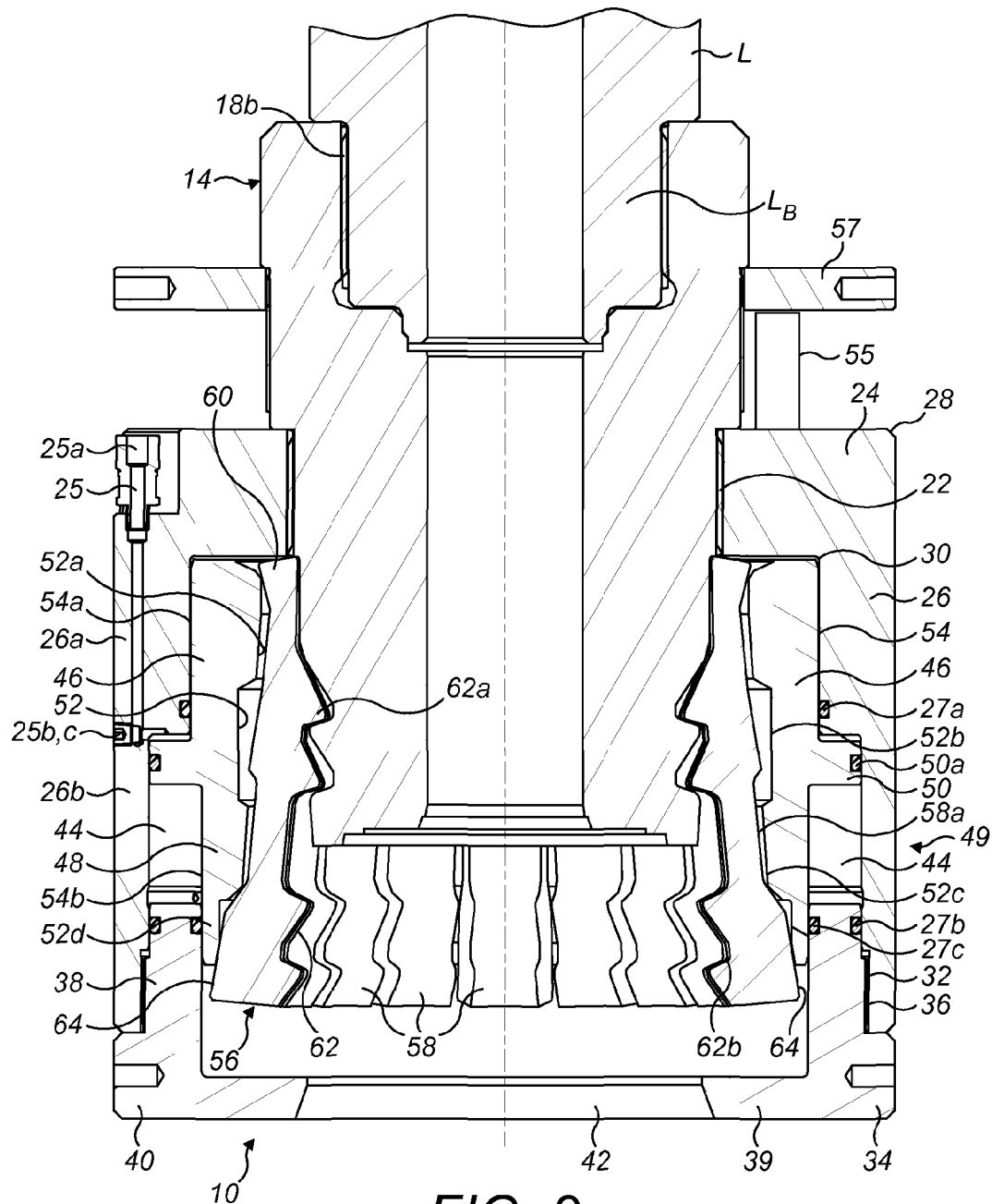
FIG. 2 is a detailed view of FIG. 1.
Figure 3:
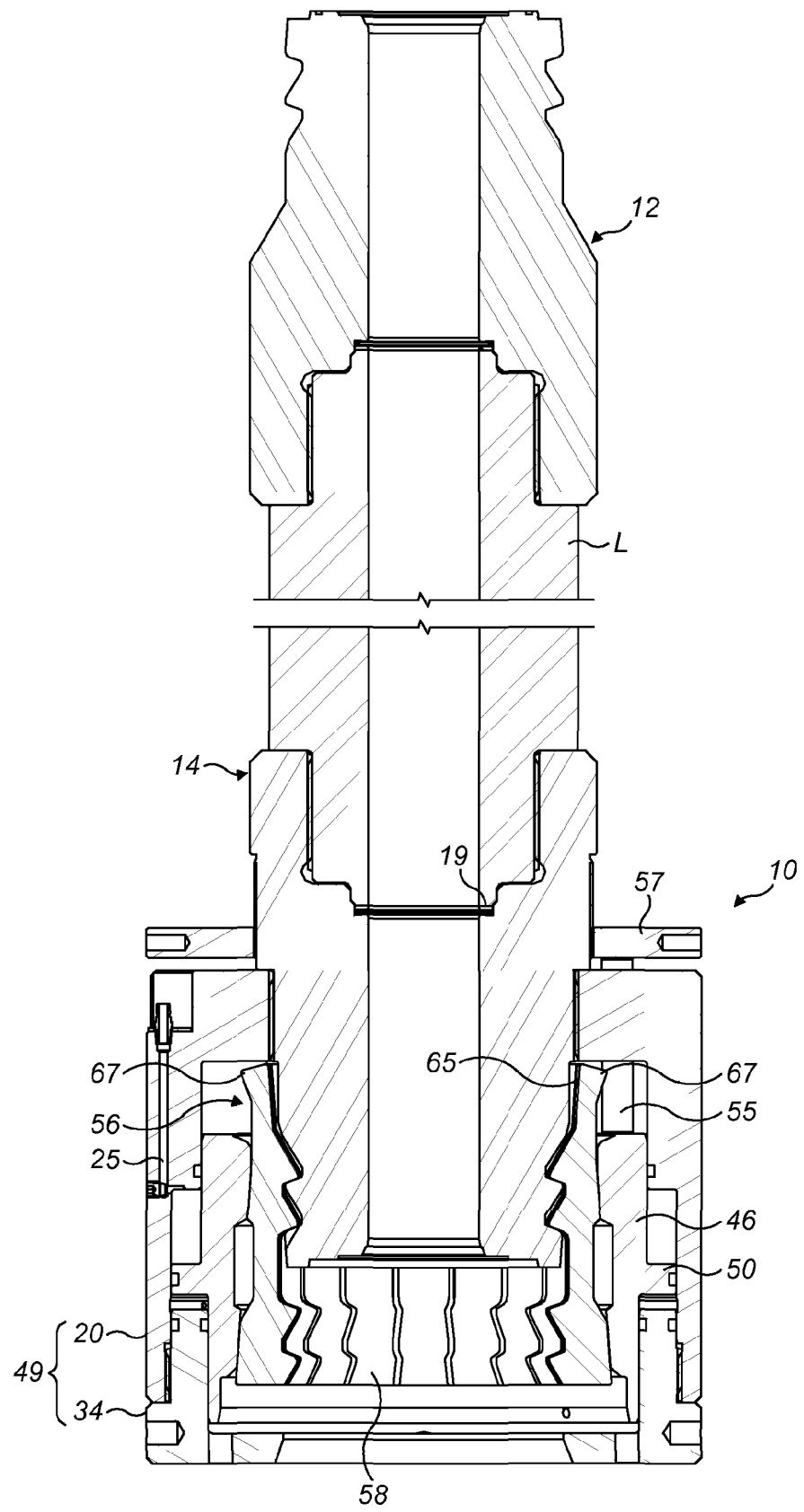
FIGS. 3 and 4 show similar views to FIGS. 1 and 2 with the same connector in a closed configuration.
Figure 4:
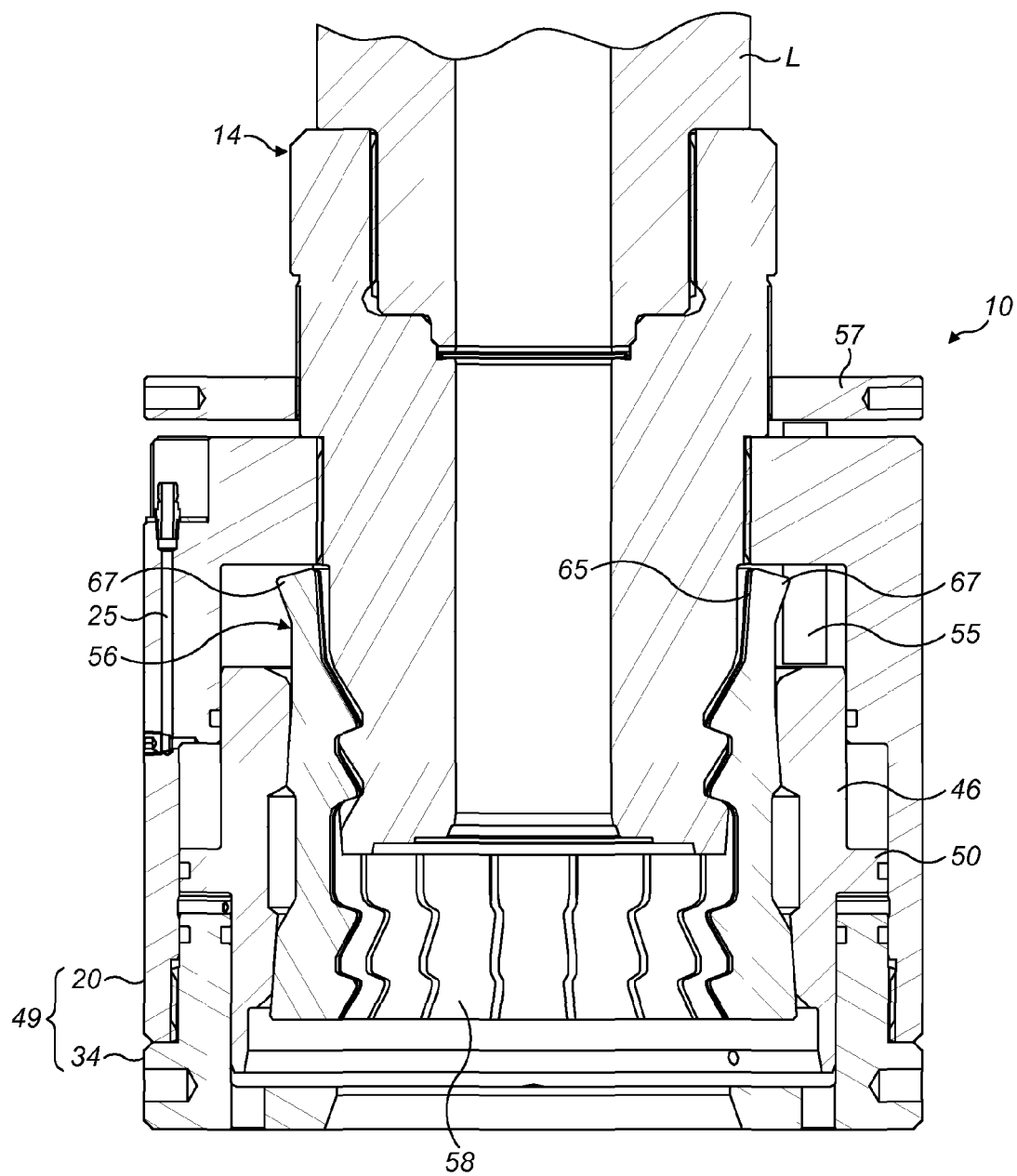

The inner surface 52 comprises four varying diameter sections. Uppermost section 52a is located at the end of the piston sleeve 46 adjacent the upper housing flange 24. It has the smallest mean internal diameter and therefore the greatest mean wall thickness of the piston sleeve 46 is located at the uppermost section 52a. Both axial ends of the uppermost section 52a are chamfered. It should be noted that in the example of FIGS. 1 and 2, the uppermost section 52a does not have a constant diameter but rather a linear varying diameter to form a slightly frustum-shaped internal diameter section.

A first intermediate section 52b is located adjacent the uppermost section 52a. First intermediate section 52b has approximately equal axial length to the uppermost section 52a. First intermediate section 52b has a greater internal diameter than the uppermost section 52a, and does not have a frustum shape; rather it has a more regular cylindrical shape, typically with substantially parallel sides typically parallel to the inner surfaces of the housing 49.

A second intermediate section 52c is located adjacent (e.g. below) the first intermediate section 52b, and below it from the perspective of the Figs. The second intermediate section 52c is similar in appearance to the uppermost section 52a in that it does not have a constant diameter but rather a linear varying diameter to form a slightly frustum-shaped internal diameter section. It will be noted that in the present example, the innermost surface of the second intermediate section 52c and the uppermost section 52a share a common plane. This is 4° from vertical in the present example. This angle may be varied in other examples, but will typically be between 3° and 6° from vertical, typically diverging towards the lower housing 24 when the collet connector is in its open configuration shown in FIGS. 1 and 2.

Lastly, a lowermost section 52d projects from the lower end of the second intermediate section 52c. It is generally cylindrical, albeit with chamfered edges on its innermost and outermost surfaces at its lower extent, located distally from the second intermediate section 52c. It has the least axial dimension of the four sections.

The outer surface comprises three discrete sections: an upper section 54a, the piston flange 50 and a lower section 54b. All three have a cylindrical outer surface: the upper section 54a abutting and forming a sliding fit with the cylindrical sidewall 26 of the upper housing 20; the piston flange 50 abutting and forming a sliding fit with the piston recess 44; and the lower section 54b abutting and forming a sliding fit with the cylindrical sidewall 38 of the lower housing 34.

The piston flange 50 has the greatest outermost diameter of the three sections, as its movement (as will subsequently be described) is restricted by the cylindrical sidewall 38 of the lower housing 34 and the cylindrical sidewall 26 of the upper housing 20 within the piston recess 44. A piston flange O-ring 50a is mounted around the outer circumference of the piston flange 50 enabling a seal to be formed between the piston flange 50 and the piston recess 44.

The lower section 54b has the least outermost diameter of the three sections, to match the inner diameter of the cylindrical sidewall 38 of the lower housing 34.

The upper section 54a has a slightly greater outermost diameter than the lower section 54b, to match the inner diameter of the cylindrical sidewall 26 of the upper housing 20, which itself is slightly greater than the inner diameter of the cylindrical sidewall 38 of the lower housing 34.

An indicator rod 55 is mounted on top of the piston sleeve 46. It projects through an indicator rod bore (not shown) which extends through the flange 24 of the upper housing 20. The indicator rod 55 is a generally cylindrical member made of low alloy steel.

Around the approximate mid-section of the lower adapter 14 there is a lock ring thread 18f. A lock ring 57 is mounted around this lock ring thread 18f. The lock ring 57 can traverse the lock ring thread 18f and may bear against indicator rod 55, as shown in the Figs.

A collet ring 56 is arranged within the piston sleeve 46. It is formed from a solid cylindrical ring of material which is then machined into a plurality of individual collet fingers 58. The collet fingers 58 project (downwardly from the perspective of the Figs) from a solid ring member 60. The ring member 60 maintains the position of one end of the collet fingers 58 in a constant position, and the collet fingers 58 splay radially outwardly forming a generally frusto-conical shape. In the presently described example there are sixteen collet fingers 58 on the collet ring 56.

The collet fingers 58 and therefore the collet ring 56 also, although forming a substantially frusto-conical shape, have non-linear inner surfaces 62 and non-linear outer surfaces 64.

The inner surfaces 62 are machined with annular toothed profiles 62a, 62b. The uppermost annular toothed profile 62a is substantially sawtooth-shaped and corresponds in shape and arrangement to the annular toothed profile 18e of lower adapter 14. As depicted by the Figs, the annular toothed profile 18e of lower adapter 14 forms an interference fit with the uppermost annular toothed profiles 62a preventing relative axial displacement of the two.

The lowermost annular toothed profile 62b has a similar profile, albeit reversed, such that the more acute angles of the recesses are spaced distally opposite from one another.

The outer surfaces 64 of the collet fingers 58 are typically non-linear in shape. A generally frustum outer shape is formed when the fingers 58 splay radially outwards, approximately halfway down and encompassing approximately 25% of the axial length of the collet fingers 58 there is a collet recess 58a which is in the form of a section with a lesser outer diameter. The recess has an outer surface with a plane approximately parallel to a plane of the outer surface of the general frustum shape of the remainder of the outer surfaces 64.

Figure 5:
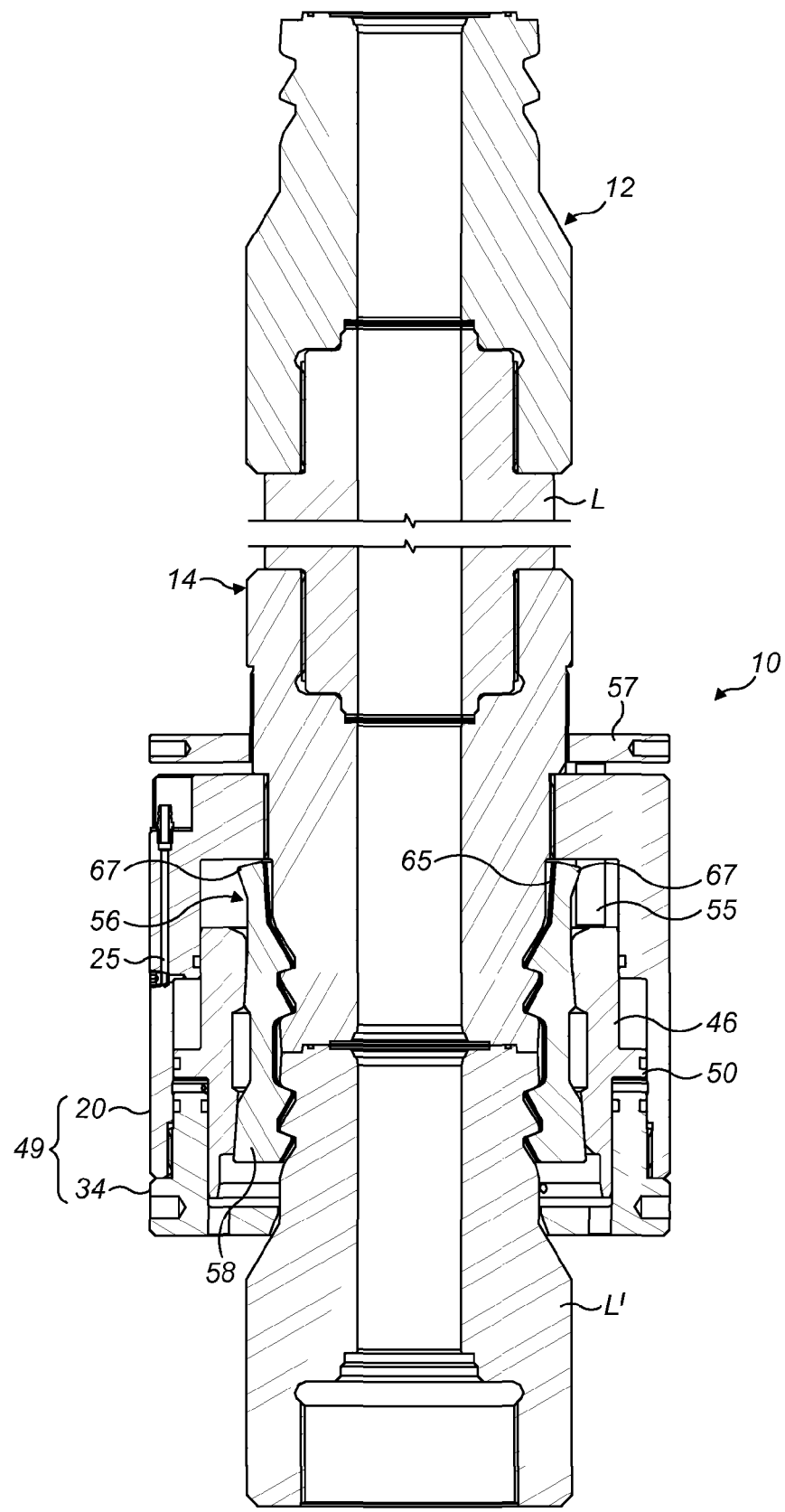
FIGS. 5 and 6 show similar views to FIGS. 3 and 4 with a second wireline conduit connected to the first.
Figure 6:
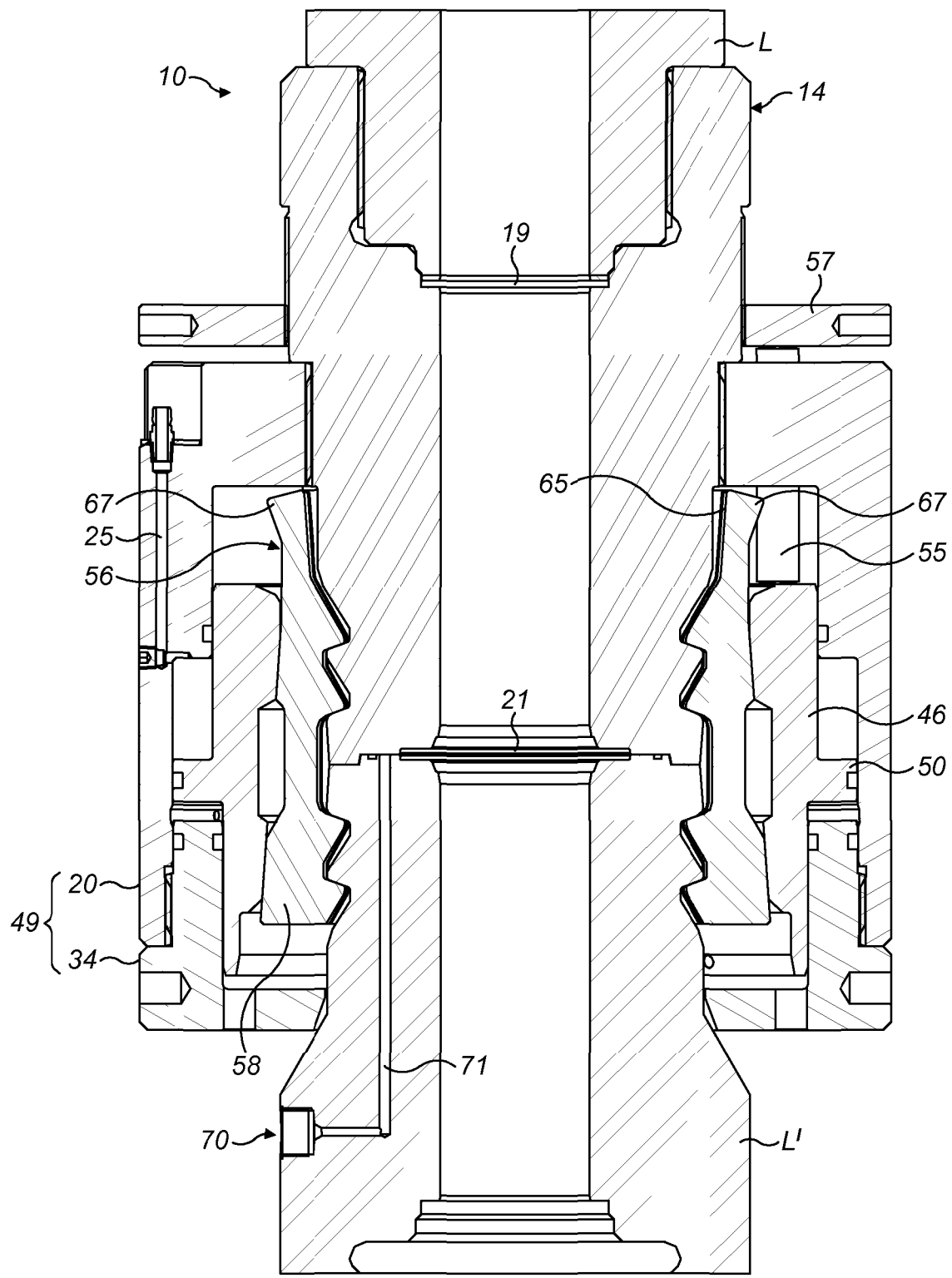

In use, a further section of lubricator tube L' may optionally have an adapter attached. The adapter, being similar to that of the upper adapter 12 can be introduced into the lower housing orifice 42 until its annular toothed profiles are located within the space between the splayed collet fingers 58 and adjacent the lowermost annular toothed profile 62b on the inner surface of the collet fingers 58, as is best shown in FIGS. 5 and 6. Alternatively the profiles can be formed on the lubricator L' and the adapter can be omitted.

A hydraulic supply can then attached to the hydraulic bore 25 via either the female quick connect fitting 25a or the male quick connect fitting 25b. Hydraulic fluid will be pumped into the bore 25 and be forced into the piston recess 44 and bear against the upper surface of the piston flange 50. The pressure will cause the piston flange 50 to move downwardly, and thus the piston sleeve 46 will also descend.

The non-linear inner surface 52 of the piston sleeve will slide over the outer surfaces 64 of the collet fingers 58. As is most easily seen in FIGS. 3-6, the tapered and axially spaced sections 52a and 52c of the inner surface of the piston sleeve engage on the tapered and axially spaced sections of the outer surface 64 of the collet fingers, which are typically tapered at the same non-aligned angle with respect to the axis of the connector. Typically the axial spacing between the engaging tapered faces on the inner surface of the piston sleeve 46 and the outer surface of the collet fingers 58 are also matched, so that the tapered surfaces engage throughout the stroke of the piston sleeve 46. Therefore, a wedge effect is created by the opposed tapered surfaces of the piston sleeve 46 and the collect fingers 58, which converts the axial movement of the piston sleeve 46 under the force of the hydraulic fluid into a radial force that compresses the collet fingers 58 radially inwards against the conduits. As the tapered varying diameter sections 54a,54b,54c,54d descend over the general frustum shape of the collet device, they urge the collet fingers 58 radially inwards from their splayed position shown in FIGS. 1 and 2 to a radially compressed configuration shown in FIGS. 3-6, in which the collet fingers 58 are have moved radially inwards towards the axis of the lubricator tube, but as can be seen in FIGS. 3-6, the outer surface of the collet fingers 58 is typically still tapered in the final closed configuration, which allows the piston to continue the compressive force applied to the collet fingers 58 throughout the length of its axial stroke, and thus energises the connection even in the fully closed configuration.

Eventually, the lowermost annular toothed profile 62b on the inner surface of the collet finger 58 engages the annular toothed profiles of the outer surface of the second adapter forming an interference fit similar to that of the annular toothed profile 18e of lower adapter 14 with the uppermost annular toothed profiles 62a. It should be noted from the closed configurations shown in FIGS. 3-6, that the toothed profiles are not symmetrical and that when the profiles are fully engaged, the teeth 62 on the inner surfaces of the collet fingers 58 have not yet travelled to the radially innermost point of the recess, yet, the teeth 18e on the outer surface of the adapter 18 have engaged fully in the recesses on the inner surface of the collet fingers 58. Also, the two sides of the recess are set at different angles, so that when the profiles are fully engaged, the force is applied to the inner faces of the recess and in preference to the outer faces of the recesses, thereby converting most of the radial compressive forces back into axial forces to compress the seal between the two conduits L and L', as is best seen in FIG. 6. Thus, a connection between the introduced further section of lubricator tube L' and the first lubricator tube L is formed. As the collet fingers 58 are driven radially deeper into the toothed profiles the adapters 12 and 14 are driven together axially by the angular differences between the collet fingers 58 and the toothed profiles. This movement energises the metal seal 21 between the two sections of lubricator tube.

As the piston sleeve 46 descends so too does the indicator rod 55. Once the desired connection between the introduced further section of lubricator tube and lubricator tube L is formed, the lock ring 57 may be rotated around lock ring thread 18f, to axially traverse the lock ring thread 18f and move it down to bear against the upper surface of the indicator rod(s) 55. The lock ring 57 therefore forms an abutment preventing the piston sleeve 46 ascending and thereby releasing the introduced further section of lubricator tube from its connection with lubricator tube L. Contrast the two positions of the lock ring 57 in the open configurations in FIGS. 1 and 2 and the closed configurations in FIGS. 3-6. One or more than one indicator rod 55 can be provided in different examples, but only one is in section in the drawings shown.

It will be appreciated that the movement of the piston flange 50 is restricted by the cylindrical sidewall 38 of the lower housing 34 and the cylindrical sidewall 26 of the upper housing 20 within the piston recess 44. Since the movement of the piston flange 50 is restricted so too is the movement of the piston sleeve 46, and so when the piston sleeve 46 has moved into the second closed configuration as shown in FIGS. 3-6, the lock ring 57 and indicator rod(s) 55 lock it in position and prevent loosening of the connection from the closed configuration.

FIG. 6 shows a different section of the connector, showing a test port 70 exposed to an outer wall of the second (lower) conduit L', typically formed in the adaptor of the second conduit L', and having a bore 71 connecting the test port 70 to a space behind the seal 21 between the conduits L, L'. This test port 70 is typically closed by a removable cap and may optionally have a valve, and permits the pressure in the chamber behind the seal 21 to communicate with the test port, thereby allowing connection of monitoring equipment to the port 70 to determine and optionally record the prevailing pressure in the space radially outside the seal 21. This can be used to report and measure any pressure changes that may indicate loss of integrity of the seal 21, without requiring dis-assembly of the connection. Typically an operator can inject pressure into the port 70 to bear on the seal 21 from the outside. Optionally the port 70 is provided in the adaptor, but could be provided in the body of the conduit L' or in another part of the apparatus. Similar ports can be provided in the first conduit L, but are not shown in section in the drawings.

The upper end of the collet device 60 typically has a heel 67 with a taper that extends radially outward from the fingers 58, and with an inner surface 65, which is also tapered radially outwards. The heel 67 interacts with the piston sleeve 46 in the open configuration shown in FIGS. 1 and 2, so that when the piston sleeve 46 retracts fully upwards in the housing 49, the heel 67 is forced radially inwards to press the tapered inner surface 65 against the parallel outer surface of the adapter 14, with the result that the collet fingers 58 pivot around the fulcrum created by the end of the tapered inner surface 65 to spring open at the lower end and release the engaged profiles connecting the two conduits L, L1. This feature facilitates disengagement of the collet fingers 58 to release the connection.

Although relative terms "upper", "lower", "uppermost", "lowermost", "downward", "upward", etc. are used hereinbefore, it will be understood that these relate only to the orientation of the embodiment as depicted in the attach Figures. The skilled addressee will appreciate that the embodiment will function independent of orientation and is not limited to any particular orientation.

Modifications and improvements may be made to the foregoing without departing from the scope of the invention. For example, the invention is not limited to the specific materials such as INCONEL® for the adaptor bodies or low alloy steel for the indicator rod. Suitable materials and alloys may be used, such as, for example, stainless steel for the indicator rod.

Further, the specific dimensions and angles may be varied depending on application.

The present invention may find utility in wireline intervention equipment. Such equipment is temporary, quick rigup/rigdown gear, and so commonly uses manual quick union collars with elastomeric seals.

The present invention enables quick disconnection of such unions while being capable of energising metal seals which may be primary joint seals between temporary pressure equipment.

The invention claimed is:

1. A connector device for use in wireline intervention operations, for coupling a first conduit to a second conduit, the first and second conduits each having a bore and wherein the first and second conduits are adapted to receive a wireline within the bore, the connector device comprising a housing on the first wireline conduit, a piston sleeve located within the housing, a collet device configured to receive and retain the second conduit, the collet device having a plurality of collet fingers arranged within said piston sleeve, the piston sleeve being movable within the housing from a first position, where the collet fingers are in a receiving position, to a second position, where the collet fingers are in a clamping position, including a restrictor configured to control movement of the piston sleeve, the restrictor being adjustable between a first configuration permitting axial movement of the piston sleeve within the housing between the first and second positions, and a second configuration restricting movement of the piston sleeve out of the second position within the housing.

2. A connector device as claimed in claim 1, wherein the second configuration of the restrictor locks the piston sleeve in the second position when the collet fingers are in the clamping position.

3. A connector device as claimed in claim 1, wherein the restrictor includes at least one indicator rod which projects out of the housing, and wherein the indicator rod is mounted on the piston sleeve and moves with the piston sleeve between the first and second positions relative to the housing.

4. A connector device as claimed in claim 1, wherein the restrictor comprises a threaded flange axially movable on a thread relative to the piston sleeve.

5. A connector device as claimed in claim 3, wherein:
the restrictor comprises a threaded flange axially movable on a thread relative to the piston sleeve; and
wherein in the second position, the threaded flange restricts the movement of an end of the at least one indicator rod and resists movement of the at least one indicator rod and the piston sleeve relative to the housing.

6. A connector device as claimed in claim 1, wherein outer surfaces of the first and second conduits have an external profile configured to cooperate with an internal profile on the collet fingers, whereby interaction of the profiles on the collet fingers and the conduits draws the first and second conduits axially together.

7. A connector device as claimed in claim 6, incorporating a metal sealing member between the first and second conduits, wherein the metal sealing member is compressed by action of the collet fingers moving into the clamping position.

8. A connector device as claimed in claim 1, wherein the piston sleeve is sealed within the housing and is urged from the first to the second position by hydraulic pressure delivered to the housing.

9. A connector device as claimed in claim 1, wherein at least a first portion of an inner surface of the piston sleeve is tapered at a non-aligned angle with respect to an axis of the connector, and wherein at least a second portion of the inner surface of the piston sleeve is tapered at the same angle as at least a portion of an outer surface of the collet fingers, wherein the first portion of the inner surface of the piston sleeve is axially spaced apart from the second portion of the inner surface of the piston sleeve.

10. A connector device as claimed in claim 9, wherein the tapered inner surface of the piston sleeve comprises a number of discontinuous sections.

11. A connector device as claimed in claim 10, wherein at least two of the discontinuous sections are aligned at the same tapered angle and in the same plane.

12. A connector device as claimed in claim 1, wherein the piston sleeve has a discontinuous inner surface with at least two tapered regions at spaced apart locations on the piston sleeve, which are tapered at non-aligned angles to match tapered portions of the outer surface of the collet device, and whereby the tapered surfaces in each case diverge away from the axis of the connector device in a direction towards an open end of the collet device, whereby as the piston sleeve moves in the direction towards the open end of the collet device, the tapered surfaces on the collet device and the piston sleeve engage to apply a radial force to the collet device to close the fingers at the open end of the collet device.

13. A connector device as claimed in claim 10, wherein the tapered inner surface incorporates radial steps between at least two of the discontinuous sections.

14. A connector device as claimed in claim 9, wherein the inner surface of the piston sleeve comprises four discontinuous sections arranged sequentially on the piston sleeve between a first end of the piston sleeve closest to an inner end of the collet device, and a second end of the piston sleeve, closest to an outer end of the collet device, wherein the outer end of the collet device receives and retains the second conduit; and wherein the discontinuous sections are arranged with a narrowest internal diameter section at the first end of said piston sleeve, followed by a larger internal diameter section, followed by a narrower internal diameter section, followed by a final section having the largest internal diameter.

15. A connector device as claimed in claim 1, including a piston flange projecting outwardly from the outer surface of the piston, wherein the piston flange seals in a piston recess located on an inner surface of the housing.

16. A connector device as claimed in claim 1, wherein the outer surface of the collet fingers splay radially outward from the axis of the connector device to form a frustum shape in the receiving position, and move radially inward towards alignment with the axis in the clamping position.

17. A connector device as claimed in claim 1, wherein the housing comprises at least one hydraulic bore configured to receive pressurised hydraulic fluid to urge the piston sleeve between the first position and the second position.

18. A connector device as claimed in claim 17, wherein the hydraulic bore has an inlet for hydraulic fluid and a selectively operable port connecting the hydraulic bore with an outer surface of the housing.

19. A connector device as claimed in claim 1, comprising a test port, accessible from an external wall of the device, in fluid communication with a seal between the first and second conduits, and adapted to transmit pressure at the seal to the test port.

20. A wireline assembly comprising first and second conduits, connected by a connector device according to claim 1, the conduits having a bore and adapted to receive a wireline in the bore.

21. A method of coupling a first conduit to a second conduit, the first and second conduits having a bore and wherein the first and second conduits are adapted to receive a wireline within the bore, the method comprising providing a housing on the first conduit, a piston sleeve located within the housing, and a collet device configured to receive and retain the second conduit, the collet device having a plurality of collet fingers arranged within said piston sleeve, and wherein the method includes moving the piston sleeve within the housing from a first position, where the collet fingers are in a receiving position, to a second position, where the collet fingers are in a clamping position; the method including adjusting a restrictor from a first configuration permitting axial movement of the piston sleeve within the housing between the first and second positions to a second configuration restricting movement of the piston sleeve out of the second position within the housing.

22. A connector device for use in wireline intervention operations for coupling a first conduit to a second conduit, the first and second conduits each having a bore and wherein the first and second conduits are adapted to receive a wireline within the bore, the connector device comprising a housing on the first conduit, a piston sleeve located within the housing, and a collet device configured to receive and retain the second conduit, the collet device having a plurality of collet fingers arranged within said piston sleeve, the piston sleeve being movable within the housing from a first position, where the collet fingers are in a receiving position, to a second position, where the collet fingers are in a clamping position, including a restrictor configured to control movement of the piston sleeve, the restrictor being adjustable between a first configuration permitting axial movement of the piston sleeve within the housing between the first and second positions, and a second configuration restricting movement of the piston sleeve out of the second position within the housing;

wherein the restrictor includes at least one indicator rod which projects out of the housing, and wherein the at least one indicator rod is mounted on the piston sleeve and is moveable with the piston sleeve between the first and second positions relative to the housing when the restrictor is in the first configuration; and wherein the restrictor comprises a threaded flange axially movable on a thread on the housing relative to the piston sleeve; and wherein in the second position, the threaded flange bears against an end of the at least one indicator rod and resists movement of the at least one indicator rod and the piston sleeve relative to the housing.

* * * * *

UNITED STATES PATENT AND TRADEMARK OFFICE
CERTIFICATE OF CORRECTION

| | | |
|---|---|---|
| PATENT NO. | : 9,689,211 B2 | Page 1 of 1 |
| APPLICATION NO. | : 14/359895 | |
| DATED | : June 27, 2017 | |
| INVENTOR(S) | : Runi Joensen et al. | |

It is certified that error appears in the above-identified patent and that said Letters Patent is hereby corrected as shown below:

In the Claims

Column 9, Line 54,　　　Replace "housing on the first wireline conduit," with
Claim 1　　　　　　　　-- housing on the first conduit, --

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*